FRANK ELMER HALL'S
STALL FLOOR.

No. 121,243.   Patented Nov. 28, 1871.

WITNESSES.
Lemuel P. Jenks
H. A. Hall

INVENTOR.
Frank Elmer Hall.

121,243

UNITED STATES PATENT OFFICE.

FRANK ELMER HALL, OF BRIDGEWATER, MASSACHUSETTS.

IMPROVEMENT IN STALL-FLOORS.

Specification forming part of Letters Patent No. 121,243, dated November 28, 1871.

*To all whom it may concern:*

Be it known that I, FRANK ELMER HALL, of Bridgewater, in the county of Plymouth and State of Massachusetts, have invented a new and Improved Stall-Floor for Stables, of which the following is a specification:

The nature of my invention consists in a peculiar arrangement of the materials forming a floor for stalls in stables and barns in which horses, &c., are placed; and the object is to keep the stall clean by allowing the liquid excrements of the animals occupying the stall to pass away by gravitation.

Figure 1:
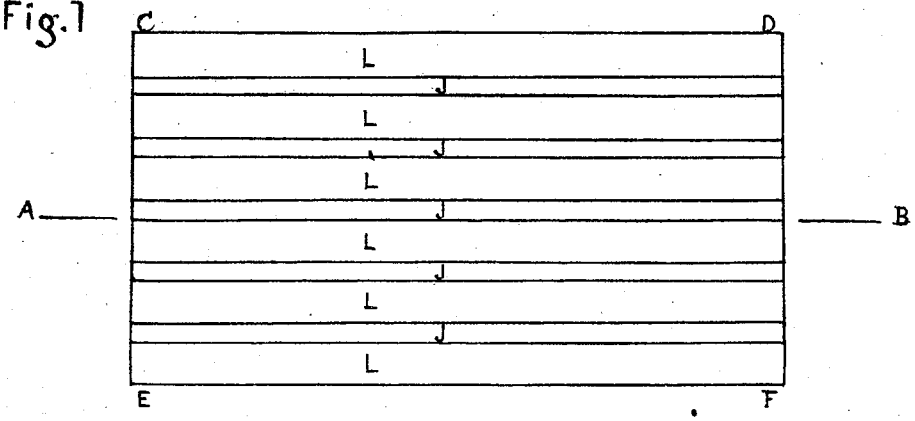
Figure 2:
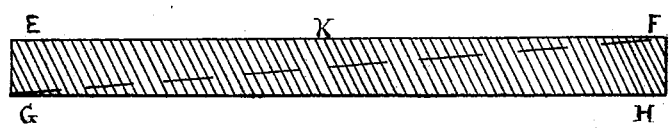
Figure 3:
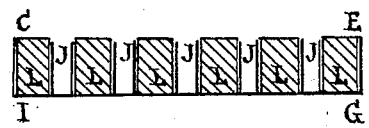

Figure 1 is a view from above of my invention. Fig. 2 is a vertical longitudinal sectional view on the line A B of Fig. 1. Fig. 3 is a view of the rear or tail end.

In the drawing, C D E F, Fig. 1, E F G H, Fig. 2, C E I G, Fig. 3, are the respective corners of a metallic bed-plate—say of iron—of the shape of a parallelogram, and with three upright sides. This bed-plate is seen, in Fig. 3, to be furnished on its upper surface with ten metallic upright divisions running from end to end, placed in pairs, the space between the two members of each pair being left open above and closed at the bottom by a floor—also of metal, preferably—running from the front or head end of the bed-plate to the rear or tail of the same, at which latter end, as seen by the dotted line K in Fig. 2, which shows the course of the floor, this floor is lower than at the head end. The spaces J J, &c., between the several members of the pairs of dividing-walls thus form a gutter, with each, respectively, making a floor or bottom, arranged as an inclined plane. In the spaces between the gutters J J, &c., are laid, (L L L L L L, Figs. 1 and 3,) longitudinally as regards the bed-plate, slabs or bars, preferably of wood, called the floor-bars, whose upper surfaces are in the same horizontal plane with each other and come, preferably, a little above the upper edges of the upright divisions forming the sides of the gutters mentioned.

I sometimes make these floor-bars convex or of other shape, instead of flat on the upper side, and sometimes groove them crosswise or otherwise, to prevent the slipping of the animals on them.

The whole apparatus is laid upon the ordinary plank or board bottom of the stall, or upon the joists there; and when in use the liquid excrements of the animal occupying the stall, falling upon the floor, pass immediately into the gutters, and, running down the inclined bottoms of the same, are discharged at the rear or tail end of the same, and thence carried away by any convenient device.

The advantages of my device are that I get ample inclination for the free passage of the liquids through the gutters without so much inclining the standing surface as to throw the animal's weight too much on the hind quarters; and, further, by the use of the metallic portion of my device I avoid the damage to the floor resulting from alternate expansion and contraction of a wooden floor as it becomes wet or dry.

I do not claim the inclined floor and slats simply, nor the inclined floor and slats in combination with a trough at one end; nor do I claim the combination of metallic bed-plates or frames with blocks of stone or wood for paving or flooring purposes; but

What I claim as of my own invention, and desire to secure by Letters Patent, is—

In the construction of stall-floors, the arrangement of the metallic bed-plate, the inclined gutters, and the wooden floor-bars, when constructed substantially as shown and described.

FRANK ELMER HALL.

Witnesses:
   LEMUEL P. JENKS,
   JEROME DAVIS. (144